US010917913B2

(12) United States Patent
Cariou et al.

(10) Patent No.: US 10,917,913 B2
(45) Date of Patent: Feb. 9, 2021

(54) APPARATUS, SYSTEM AND METHOD OF COMMUNICATION BASED ON CLEAR CHANNEL ASSESSMENT (CCA) IN ONE OR MORE DIRECTIONS

(71) Applicant: INTEL IP CORPORATION, Santa Clara, CA (US)

(72) Inventors: Laurent Cariou, Portland, OR (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 257 days.

(21) Appl. No.: 15/084,903

(22) Filed: Mar. 30, 2016

(65) Prior Publication Data

US 2017/0118773 A1 Apr. 27, 2017

Related U.S. Application Data

(60) Provisional application No. 62/246,178, filed on Oct. 26, 2015.

(51) Int. Cl.
*H04W 74/08* (2009.01)
*H04B 7/0413* (2017.01)

(52) U.S. Cl.
CPC ...... *H04W 74/0816* (2013.01); *H04B 7/0413* (2013.01)

(58) Field of Classification Search
CPC .................. H04B 7/0413; H04W 74/0816
See application file for complete search history.

(56) References Cited

U.S. PATENT DOCUMENTS

| 2006/0279460 A1 | 12/2006 | Yun et al. |
| 2010/0172296 A1 | 7/2010 | Singh et al. |
| 2011/0211490 A1 | 9/2011 | Nikula et al. |
| 2011/0255618 A1* | 10/2011 | Zhu ............ H04B 7/0413 375/260 |

(Continued)

FOREIGN PATENT DOCUMENTS

| CN | 103493578 | 1/2014 |
| WO | 2010056887 | 5/2010 |

(Continued)

OTHER PUBLICATIONS

International Search Report and Written Opinion for PCT/US2016/053656, dated Dec. 21, 2016, 12 pages.

(Continued)

*Primary Examiner* — Andrew Lai
*Assistant Examiner* — M Mostazir Rahman
(74) *Attorney, Agent, or Firm* — Shichrur & Co.

(57) ABSTRACT

Some demonstrative embodiments include apparatuses, devices, systems and methods of communication based on Clear Channel Assessment (CCA) in one or more directions. For example, an apparatus may include logic and circuitry configured to cause a wireless station to determine a plurality of directions to transmit a plurality of respective data streams of a Multi-Input-Multi-Output (MIMO) transmission; to detect a plurality of CCA states corresponding to the plurality of directions, respectively; and based on the plurality of CCA states, to transmit one or more selected data streams of the plurality of data streams in one or more respective selected directions of the plurality of directions.

17 Claims, 8 Drawing Sheets

(56) References Cited

U.S. PATENT DOCUMENTS

| | | | | |
|---|---|---|---|---|
| 2015/0270880 A1* | 9/2015 | Harel | .................... | H04L 5/0073 370/338 |
| 2016/0037484 A1* | 2/2016 | Kwon | ................. | H04W 72/005 370/312 |
| 2018/0084582 A1* | 3/2018 | Liu | ........................ | H04W 28/20 |
| 2018/0199369 A1* | 7/2018 | Larsson | .............. | H04W 74/006 |

FOREIGN PATENT DOCUMENTS

| | | | | |
|---|---|---|---|---|
| WO | 2014137172 | | 9/2014 | |
| WO | WO-2016206608 A1 | * | 12/2016 | ............ H04W 28/20 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Preliminary Report on Patentability for International Application No. PCT/US2016/053656, dated May 11, 2018, 8 pages.

Office Action for Chinese Patent Application No. 201680056095.6, dated Aug. 26, 2020, 11 pages.

* cited by examiner

APPARATUS, SYSTEM AND METHOD OF COMMUNICATION BASED ON CLEAR CHANNEL ASSESSMENT (CCA) IN ONE OR MORE DIRECTIONS

CROSS REFERENCE

This application claims the benefit of and priority from U.S. Provisional Patent Application No. 62/246,178 entitled "APPARATUS, SYSTEM AND METHOD OF COMMUNICATING BASED ON DIRECTIONAL CLEAR CHANNEL ASSESSMENT (CCA)", filed Oct. 26, 2015, the entire disclosure of which is incorporated herein by reference.

TECHNICAL FIELD

Embodiments described herein generally relate to communication based on Clear Channel Assessment (CCA) in one or more directions.

BACKGROUND

A wireless communication network in a millimeter-wave band may provide high-speed data access for users of wireless communication devices.

A wireless station may be configured to check if a Clear Channel Assessment (CCA) over a wireless channel is idle prior to accessing the wireless channel for a transmission.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
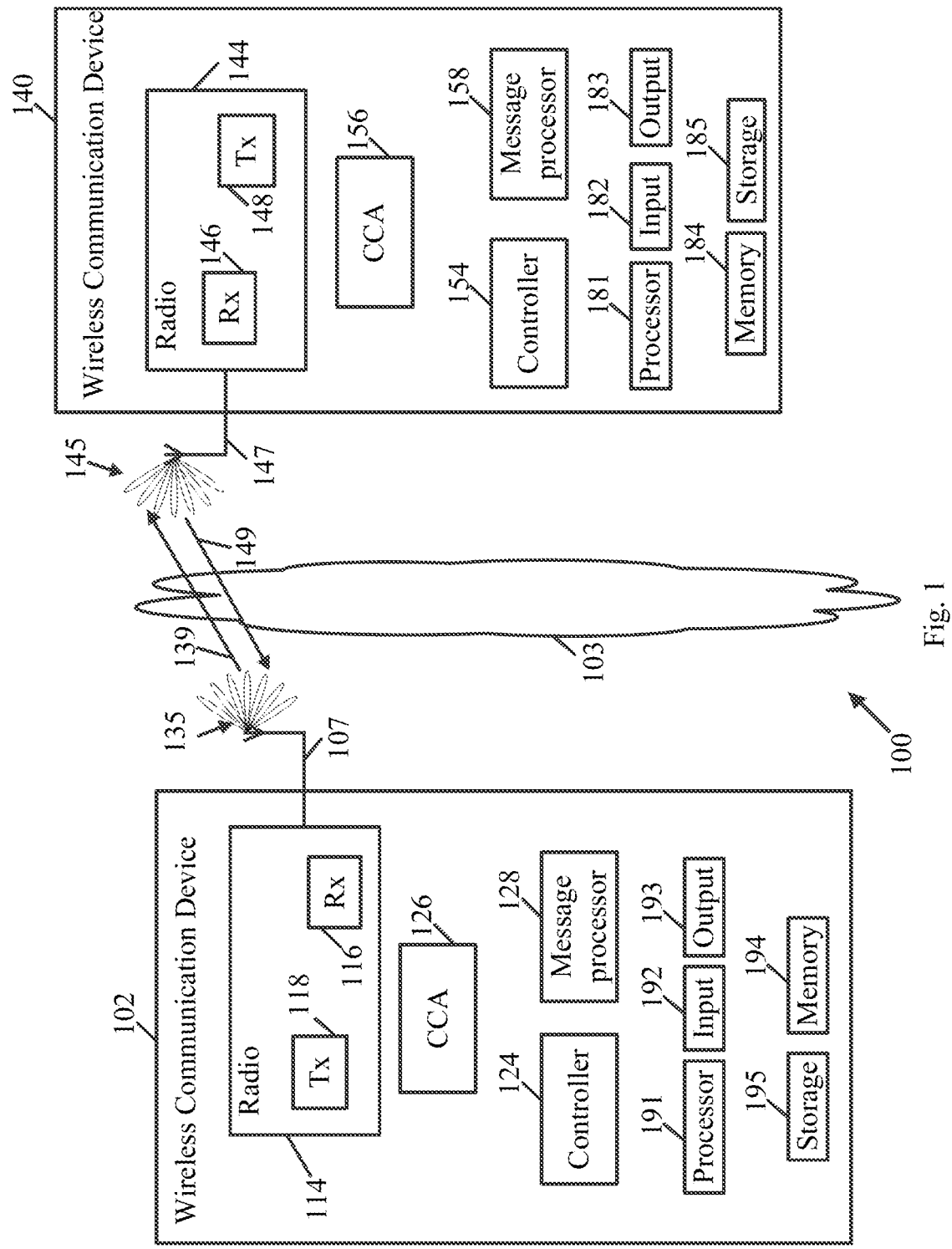
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a sensor device, an Internet of Things (IoT) device, a desktop computer, a mobile computer, a laptop computer, a notebook computer, a tablet computer, a server computer, a handheld computer, a handheld device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN*

Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (IEEE 802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (WiFi P2P technical specification, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, pgrou or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, device 102 and/or device 140 may include and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more DMG STAs. For example, device 102 may include, operate as, and/or perform the functionality of, at least one DMG STA, and/or device 140 may include, operate as, and/or perform the functionality of, at least one DMG STA.

In other embodiments, devices 102 and/or 140 may perform the functionality of any other wireless device and/or station, e.g., a WLAN STA, a WiFi STA, and the like.

In some demonstrative embodiments, device 102 and/or device 140 may be configured to operate as, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may perform the functionality of any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG bands and/or channels. In other embodiments WM 103 may include any other directional channels.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at lest one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, a mmWave band, and/or any other band, for example, a 2.4 GHz band, a 5 GHz band, an S1G band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions. For example, antenna 107 may be steered to a plurality of beam directions 135, and/or antenna 147 may be steered to a plurality of beam directions 145. For example, device 102 may transmit a directional transmission 139 to device 140, and/or device 140 may transmit a directional transmission 149 to device 102.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

Some Specifications, e.g., an IEEE 802.11ad Specification, may be configured to support a Single User (SU) system, in which a Station (STA) cannot transmit frames to more than a single STA at a time. Such Specifications may not be able, for example, to support a STA transmitting to multiple STAs simultaneously, for example, using a multi-user MIMO (MU-MIMO) scheme, e.g., a downlink (DL) MU-MIMO, or any other MU scheme.

In some demonstrative embodiments, devices 102 and/or 140 may be configured to implement one or more Multi-User (MU) mechanisms. For example, devices 102 and/or 140 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to support communication of SU-MIMO and/or MU-MIMO transmissions, for example, for communicating over the NG60 and/or EDMG networks.

In some demonstrative embodiments, a STA, e.g., device 102 and/or device 140, may be configured to perform a MIMO transmission, e.g., a SU-MIMO transmission or a MU-MIMO transmission, which may include transmissions performed in a plurality of different directions. For example, device 102 may be configured to perform the SU-MIMO transmission or the MU-MIMO transmission including transmissions performed in a plurality of different directions of beam directions 135; and/or device 140 may be configured to perform the SU-MIMO transmission or the MU-MIMO transmission including transmissions performed in a plurality of different directions of beam directions 145.

In some demonstrative embodiments, a STA, e.g., device 102 and/or device 140, may be configured to perform a Clear Channel Assessment (CCA) with respect to a plurality of different directions, e.g., before transmitting a MIMO transmission via the plurality of directions.

In some demonstrative embodiments, in some cases, a CCA state may be idle in one or more directions of the plurality of directions to be used for the MIMO transmission, while the CCA state may be busy in one or more other directions of the plurality of directions to be used for the MIMO transmission.

In some demonstrative embodiments, it may be advantageous to enable a transmitter of a Physical Layer Convergence Protocol (PLCP) Protocol Data Unit (PPDU), e.g., device 102, to transmit the PPDU in one or more directions where the CCA is idle, for example, in cases where the CCA is busy only in a subset of intended directions of the PPDU, e.g., as described below.

In some demonstrative embodiments, devices 102 and/or 140 may be configured to enable a dynamic adaptation of a transmission, for example, in cases, in which the CCA state is idle only in a subset of directions of the directions to be used for the MIMO transmission, e.g., as described below.

In some demonstrative embodiments, enabling the dynamic adaptation of MIMO transmissions, e.g., SU-MIMO and/or MU-MIMO transmissions, may enable to highly improve performance, e.g., especially in dense environments.

In some demonstrative embodiments, devices 102 and/or 140 may be configured to perform transmission in the one or more directions with the idle CCA, e.g. as described below.

In some demonstrative embodiments devices 102 and/or 140 may be configured to perform the dynamic adaptation, e.g., with a Request to Send (RTS) and/or a Clear to Send (CTS) exchange, e.g., as described below.

In some demonstrative embodiments devices 102 and/or 140 may be configured to perform the dynamic adaptation, e.g., even without an RTS/CTS exchange, e.g., as described below.

In some demonstrative embodiments, device 102 may be configured to perform a MIMO transmission to one or more devices, e.g., device 140 and/or one or more other devices.

In some demonstrative embodiments, controller 124 may be configured to control, cause and/or trigger device 102 to determine a plurality of directions, e.g., from the plurality of beam directions 135, to transmit a plurality of respective data streams of the MIMO transmission.

In some demonstrative embodiments, controller 124 may be configured to control, cause and/or trigger device 102 to detect a plurality of CCA states corresponding to the plurality of directions, respectively.

In some demonstrative embodiments, controller 124 may be configured to control, cause and/or trigger device 102 to transmit one or more selected data streams of the plurality of data streams in one or more respective selected directions of the plurality of directions, for example, based on the plurality of CCA states.

In some demonstrative embodiments, controller 124 may select the one or more selected directions, e.g., to transmit the MIMO transmission to device 140, to include directions having a detected CCA idle state.

In some demonstrative embodiments, the one or more selected directions may include, for example, only directions having a detected CCA idle state.

In some demonstrative embodiments, controller 124 may be configured to control, cause and/or trigger device 102 to construct a PPDU including the plurality of data streams, and to reconstruct the PPDU including the one or more selected data streams, for example, to be transmitted in the one or more respective selected directions.

In some demonstrative embodiments, device 102 may include one or more CCA modules 126, configured to detect the plurality of CCA idle states.

In some demonstrative embodiments, controller 124 may be configured to control, cause and/or trigger one or more CCA modules 126 to detect the plurality of CCA idle states, sequentially, e.g., one by one, for example, if a number of CCA modules is less than a number of the plurality of directions to detect the CCA.

In one example, device 102 may include a single CCA module 126 to sequentially detect the CCA in the plurality of directions.

In another example, device 102 may include two CCA modules 126 to simultaneously detect the CCA in two directions.

In another example, device 102 may include any other number of CCA modules 126 to simultaneously detect the CCA in a plurality of directions.

In some demonstrative embodiments, controller 124 may be configured to detect the plurality of CCA idle states, sequentially, e.g., one by one, for example, if device 102 includes a single CCA module.

In some demonstrative embodiments, device 140 may include one or more CCA modules 156, configured to detect the plurality of CCA idle states.

In some demonstrative embodiments, controller 154 may be configured to control, cause and/or trigger one or more CCA modules 156 to detect the plurality of CCA idle states, sequentially, e.g., one by one, for example, if a number of CCA modules is less than a number of the plurality of directions to detect the CCA.

In one example, device 140 may include a single CCA module 156 to sequentially detect the CCA in the plurality of directions.

In another example, device 140 may include two CCA modules 156 to simultaneously detect the CCA in two directions.

In another example, device 140 may include any other number of CCA modules 156 to simultaneously detect the CCA in a plurality of directions.

In some demonstrative embodiments, controller 154 may be configured to detect the plurality of CCA idle states, sequentially, e.g., one by one, for example, if device 140 includes a single CCA module.

Figure 2:
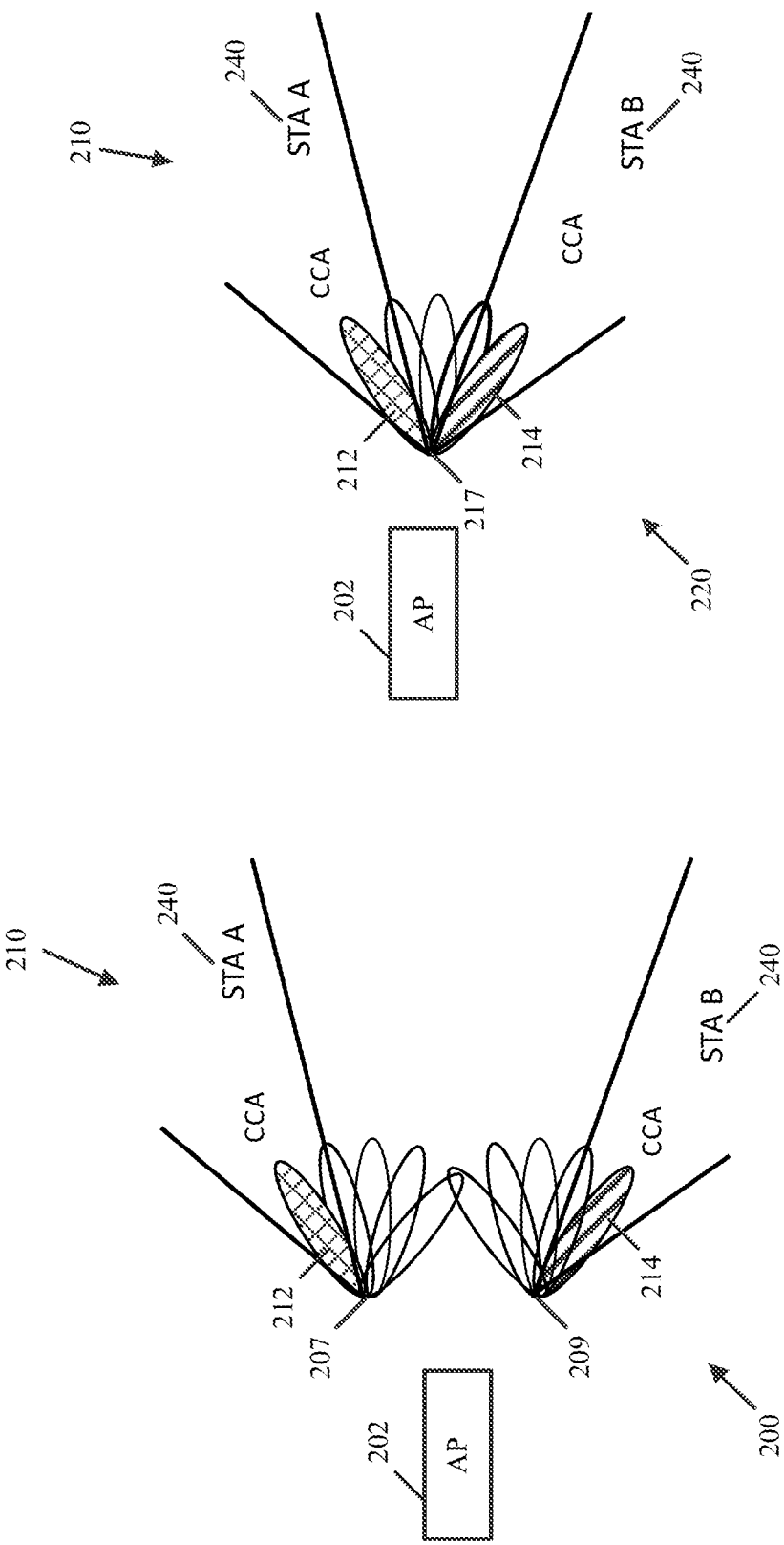
FIG. 2 is a schematic illustration of first and second Clear Channel Assessment (CCA) schemes for a Multi-User (MU) Multi-Input-Multi-Output (MIMO) (MU-MIMO) transmission, in accordance with some demonstrative embodiments.

Reference is made to FIG. 2, which schematically illustrates a first CCA scheme 200 and a second CCA scheme 220 for an MU-MIMO transmission 210, in accordance with some demonstrative embodiments.

In some demonstrative embodiments, schemes 200 and/or 220 may be implemented for a dynamic adaptation of the MU-MIMO transmission 210, for example, even without performing an RTS and/or CTS exchange, e.g., as described below.

In some demonstrative embodiments, a station 202, denoted AP, may be configured to transmit the MU-MIMO transmission 210 towards two stations 240, denoted STA A and STA B. For example, STA 202 may perform the functionality of device 102 (FIG. 1), and/or a STA 240 may perform the functionality of device 140 (FIG. 1).

In some demonstrative embodiments, the station 202 may include a single CCA module. In other embodiments, the station 202 may include a plurality of CCA modules.

In one example, station 202 may prepare to perform the MU-MIMO transmission 210, for example, after beamforming between station 202 and each of the stations 240 has already been performed.

In some demonstrative embodiments, station 202 may be configured to construct a PPDU configured to be transmitted to stations 240, for example, as part of the MU-MIMO transmission 210.

In some demonstrative embodiments, according to scheme 200, station 202 may transmit the MU-MIMO transmission 210 via two separate antennas, e.g., via an antenna 207 in a first direction 212, and via an antenna 209 in a second direction 214.

In some demonstrative embodiments, according to scheme 220, station 202 may transmit the MU-MIMO transmission 210 in the two different directions, e.g., directions 212 and 214, via a single antenna 217.

In some demonstrative embodiments, station 202 may be configured to check the CCA in the first direction 212, e.g., a direction of STA A, and the second direction 214, e.g., a direction of STA B, for example, before performing the MU-MIMO transmission 210 of the PPDU to stations 240.

In some demonstrative embodiments, station 202 may check the CCA in first direction 212 and second direction 214, sequentially, e.g., one by one or one after another, for example, if station 202 includes a single CCA module. In some demonstrative embodiments, station 202 may simultaneously check the CCA in first direction 212 and second direction 214, for example, if station 202 includes two or more CCA modules, e.g., as described below in FIG. 3.

In some demonstrative embodiments, for example, if a CCA state is idle only in a direction of one of stations 240, e.g., in the direction 212, station 202 may be able to reconstruct the to be transmitted PPDU on the fly, e.g., in real-time, for example, in order to transmit only a single stream in the direction where the CCA state is idle, e.g., direction 212 to the STA A.

Referring back to FIG. 1, in some demonstrative embodiments, devices 102 and/or 140 may be configured to be able to check the CCA, e.g., independently, in each of a plurality of directions, for example, before transmitting a SU-MIMO or MU-MIMO transmission in the plurality of directions.

In one example, the independent checking of the CCA in the plurality of directions may be performed, for example, instead of checking one CCA with respect to the energy received from all of the plurality of different directions.

In some demonstrative embodiments, device 102 may be configured to independently check the CCA, e.g., sequentially or simultaneously, in each of a plurality of directions.

In some demonstrative embodiments, the one or more CCA modules 126 may include a plurality of CCA modules, e.g., two CCA modules or more than two CCA modules.

In some demonstrative embodiments, the two CCA modules 126 may be configured to simultaneously check the CCA in a plurality of respective directions. For example, the STA may be configured to have at least as many independent CCA capabilities as a number of simultaneous directions/spatial streams supported by the STA.

In one example, the two CCA modules 126 may be configured to perform an independent CCA over two directions, e.g., simultaneously, for example, to support an MU-MIMO transmission in two directions, e.g., as described below with reference to FIG. 3.

Figure 3:
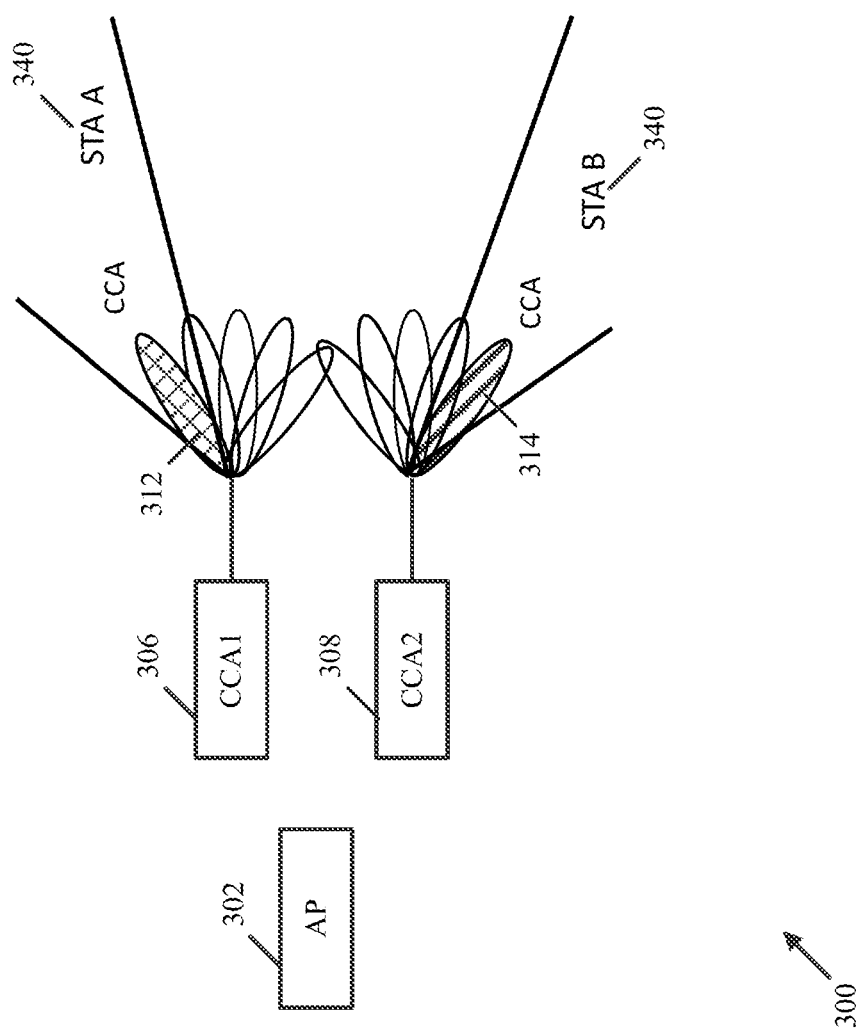
FIG. 3 is a schematic illustration of a CCA scheme for a MU-MIMO transmission, in accordance with some demonstrative embodiments.

Reference is made to FIG. 3, which schematically illustrates a CCA scheme 300 for an MU-MIMO transmission 310, in accordance with some demonstrative embodiments.

In some demonstrative embodiments, scheme 300 may be configured for a dynamic adaptation of the MU-MIMO transmission 310, for example, even without performing an RTS and/or CTS exchange.

In some demonstrative embodiments, a station 302, for example, an AP, denoted AP, may be configured to transmit the MU-MIMO transmission 310 towards two stations 340, denoted STA A and STA B. For example, STA 302 may perform the functionality of device 102 (FIG. 1), and/or a STA 340 may perform the functionality of device 140 (FIG. 1).

In some demonstrative embodiments, the station 302 may include two CCA modules, e.g., a first CCA module 306, denoted CCA 1, and a second CCA module 308, denoted CCA 2.

In some demonstrative embodiments, CCA modules 306 and/or 308 may be configured to independently perform the CCA in two directions, e.g., simultaneously. For example, the two directions may include directions, which are planned to be used by station 302, for example, for the MU-MIMO transmission 310.

In some demonstrative embodiments, station 302 may perform a multi-CCA to check the CCA in a plurality of directions.

For example, as shown in FIG. 3, station 302 may perform a 2-CCA to independently check the CCA in a direction 312 towards STA A, and in a direction 314 towards STA B, e.g., simultaneously.

In some demonstrative embodiments, station 302 may be configured to generate, construct and/or re-construct a MU-MIMO PPDU, for example, based on the results of the multi-CCA, e.g., as described below.

In some demonstrative embodiments, station 302 may be configured to select to transmit the PPDU towards the STA A and the STA B, for example, if the CCA is idle in both directions 312 and 314.

In some demonstrative embodiments, station 302 may be configured to select to defer transmission of the PPDU to a later time, or to cancel transmission of the PPDU, for example, if the CCA is busy in both directions 312 and 314.

In some demonstrative embodiments, station 302 may be configured to select to transmit the PPDU only towards at least one STA for which the CCA is idle, for example, if CCA is idle in either the direction of STA A or the direction of STA B, but not both.

In some demonstrative embodiments, station 302 may be configured to implement this solution, for example, if station 302 may be able to reconstruct the PPDU on the fly.

For example, if station 302 is planning for a MU-MIMO PPDU transmission to STA A and STA B, e.g., as described above, then station 302 may be configured to reconstruct the transmission as a SISO transmission to either STA B or STA A, e.g., based on the CCA in the directions 312 and 314.

In some demonstrative embodiments, station 302 may be configured to keep the frame format the same, e.g., the MU-MIMO format, for example, instead of reconstructing the frame in SISO format in the example above, e.g., to simplify implementation.

Referring back to FIG. 1, in some demonstrative embodiments, devices 102 and 140 may be configured communicate a MIMO transmission, for example, using dynamic adaptation with an RTS/CTS exchange, e.g., as described below.

In some demonstrative embodiments, device 102 may be configured to transmit the MIMO transmission, and/or device 140 may be configured to receive the MIMO transmission, for example, using dynamic MIMO/MU-MIMO transmission with the RTS/CTS exchange, e.g., as described below.

In some demonstrative embodiments, device 102 may be configured to implement a dynamic mechanism to adapt a MIMO transmission, e.g., using RTS and CTS exchanges, for example, in order to leave more time to adapt to a new transmission, e.g., from two streams directed to two stations into a single stream for a single station, for example, if it is too constraining to reconstruct the PPDU on the fly, e.g., as described below.

In some demonstrative embodiments, the dynamic mechanism utilizing the RTS/CTS exchange may, for example, allow a receiver of the transmission, e.g., device 140, to check a CCA state before sending the CTS back to a transmitter of the transmission, e.g., device 102.

In some demonstrative embodiments, devices 102 and/or 140 may be configured to implement a dynamic bandwidth mechanism configured to be applied to the spatial domain, e.g., instead of, or in addition to, a frequency domain, e.g., as described below.

In some demonstrative embodiments, device 102 may be configured to transmit, e.g., to device 140, one or more RTS frames in one or more respective directions, e.g., of beam directions 135, having the CCA idle state, for example, before transmission of the selected data streams in the directions having the CCA idle state ("the Tx directions").

In some demonstrative embodiments, controller 124 may be configured to control, cause and/or trigger device 102 to transmit the one or more RTS frames in the one or more respective Tx directions having the CCA idle state.

In some demonstrative embodiments, device 102 may be configured to transmit an RTS frame only in one or more directions where the CCA is idle.

In some demonstrative embodiments, sending the RTS frame in two or more directions simultaneously may potentially cause an unintended beamforming effect. Accordingly, device 102 may be configured to apply a specific delay in some of the antennas, e.g., to cause a delay between transmissions of the RTS frame in different directions.

In some demonstrative embodiments, device 140 may receive from device 102 one or more RTS frames from one or more respective directions of beam directions 145.

In some demonstrative embodiments, controller 154 may be configured to control, cause and/or trigger device 140 to detect one or more CCA states corresponding to the one or more directions ("Rx directions") of beam directions 145, e.g., via which the one or more RTS frames were received.

In some demonstrative embodiments, controller 154 may be configured to control, cause and/or trigger device 140 to transmit to device 102 one or more CTS frames in one or more respective selected Rx directions of the one or more directions of beam directions 145, for example, based on the one or more detected CCA states.

In some demonstrative embodiments, controller 154 may select the one or more selected Rx directions, e.g., to transmit the CTS frames to device 140, to include only Rx directions having a detected CCA idle state.

In some demonstrative embodiments, controller 154 may be configured to control, cause and/or trigger device 140 to transmit to device 102 the one or more CTS frames, for example, in response to a poll frame from device 102.

In some demonstrative embodiments, device 102 may receive the one or more CTS frames from device 140.

In some demonstrative embodiments, controller 124 may be configured to control, cause and/or trigger device 102 to determine the one or more selected directions, e.g., over which the selected data streams are to be transmitted, for example, to include directions from which a CTS frame is received.

In some demonstrative embodiments, devices 102 and 140 may communicate a plurality of RTS frames and a plurality of CTS frames between devices 102 and 140, for example, instead of one or more RTS frames and/or one or more CTS frames, for example, if each one of controllers 124 and/or 154 detects two or more directions between devices 102 and 140 having the CCA idle state, e.g., as described below.

In some demonstrative embodiments, device 102 may transmit a plurality of RTS frames to device 140, in a plurality of respective directions, e.g., of beam directions 135, having the CCA idle state, for example, if device 102 detects a plurality of CCA idle states in the plurality of respective Tx directions.

In some demonstrative embodiments, device 140 may receive the plurality of RTS frames from a plurality of different directions of beam directions 145.

In some demonstrative embodiments, controller 154 may be configured to control, cause and/or trigger device 140 to detect a plurality of CCA states corresponding to the plurality of the different Rx directions of beam directions 145, respectively.

In some demonstrative embodiments, controller 154 may be configured to control, cause and/or trigger device 140 to select a plurality of selected Rx directions from the plurality of different Rx directions, for example, based on the plurality of CCA states corresponding to the plurality of the different Rx directions, from which the plurality of RTS frames are received.

In some demonstrative embodiments, controller 154 may be configured to control, cause and/or trigger device 140 to transmit a plurality of CTS frames in the plurality of selected Rx directions of the different Rx directions, from which the plurality of RTS frames are received.

In some demonstrative embodiments, controller 154 may be configured to control, cause and/or trigger device 140 to sequentially transmit to device 102 two or more CTS frames of the plurality of CTS frames.

In one example, device 140 may sequentially transmit the two or more CTS frames, for example, if device 140 does not support simultaneous uplink transmission.

In some demonstrative embodiments, controller 154 may be configured to control, cause and/or trigger device 140 to simultaneously transmit to device 102 the two or more CTS frames of the plurality of CTS frames, e.g., if device 140 supports simultaneous uplink transmission.

In some demonstrative embodiments, device 102 may receive from device 140 the two or more CTS frames via two or more directions of beam directions 135.

In some demonstrative embodiments, device 102 may transmit to device 140 the MIMO transmission over the two or more directions, from which the two or more CTS frames are received.

In some demonstrative embodiments, device 140 may receive the MIMO transmission from device 102.

In some demonstrative embodiments, controller 154 may be configured to control, cause and/or trigger device 140 to process the MIMO transmission received from device 102 via the two or more directions of beam directions 145.

Figure 4:
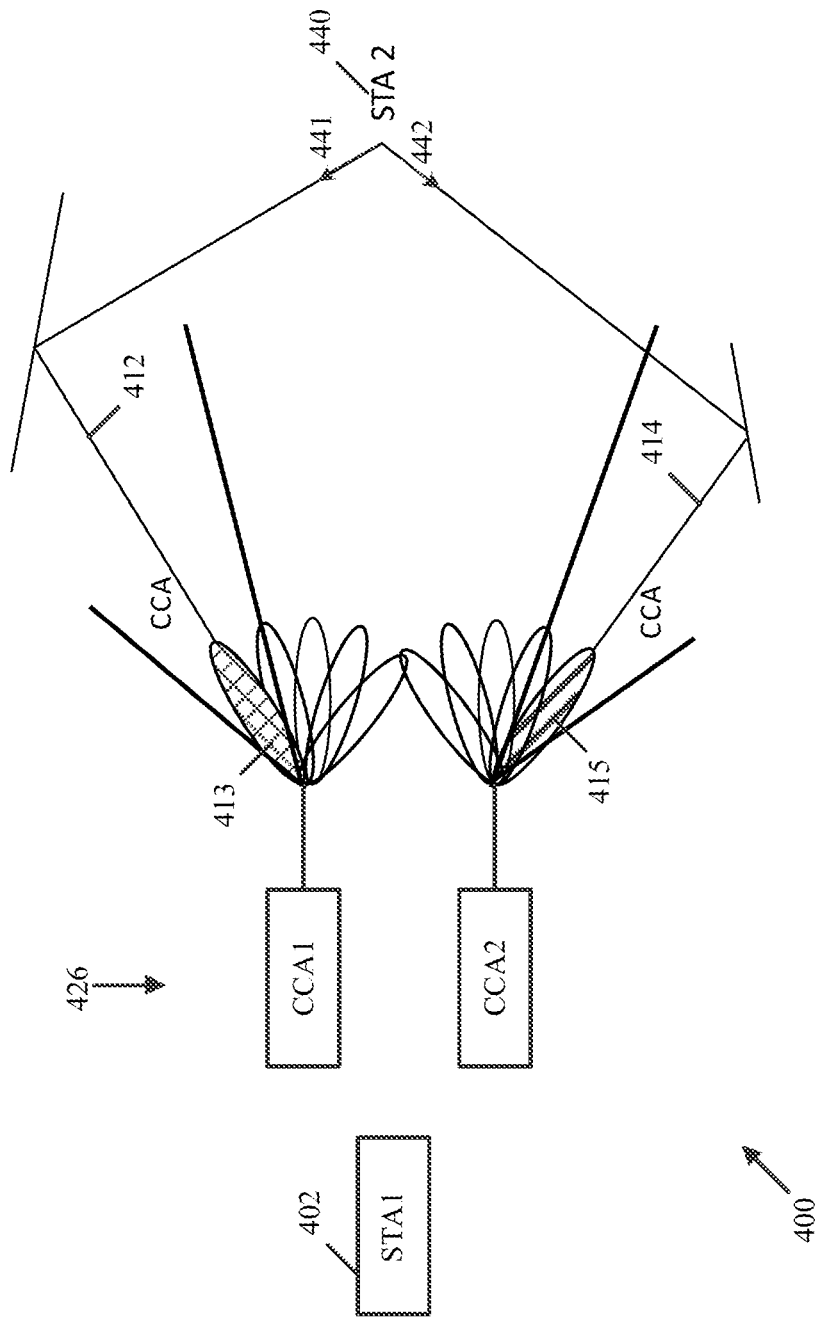
FIG. 4 is a schematic illustration of a CCA scheme for a Single-User (SU) MIMO (SU-MIMO) transmission, in accordance with some demonstrative embodiments.

Reference is made to FIG. 4, which schematically illustrates a CCA scheme 400 for a SU-MIMO transmission, in accordance with some demonstrative embodiments.

In some demonstrative embodiments, CCA scheme 400 may be configured to communicate an SU-MIMO transmission, e.g., including a first spatial stream 412 and a second spatial stream 414, between a first station 420, denoted STA1, and a second station 440, denoted STA2. For example, STA 402 may perform the functionality of device 102 (FIG. 1), and/or a STA 440 may perform the functionality of device 140 (FIG. 1).

In some demonstrative embodiments, station 402 may independently check a first CCA in a direction 413 to be used for transmission of the first spatial stream 412, and a second CCA in a direction 415 to be used for transmission of the second spatial stream 414, e.g., simultaneously, for example, using two CCA modules 426, e.g., as described above.

In some demonstrative embodiments, if the CCA is idle in both directions 413 and 415, station 402 may send a first RTS in the direction 413, e.g., using a first antenna 407, and may send a second RTS in the direction 415, e.g., using a second antenna 417, for example, while applying a specific delay to antenna 417, e.g., with respect to antenna 407.

In some demonstrative embodiments, as shown in FIG. 4, station 440 may receive the first and second RTS frames, may detect that station 440 is the intended receiver of the RTS frames, and may determine the initiator of the transmission, e.g., station 402.

In some demonstrative embodiments, station 440 may know the sectors that need to be used for the reception of spatial streams 412 and 414, e.g., if station 440 is MIMO capable having two spatial streams, e.g., spatial streams 412 and 414, and that station 440 has performed beamforming training with station 402.

In some demonstrative embodiments, station 440 may receive the first and second RTS frames via two different directions, e.g., a direction 441 and a direction 442.

In some demonstrative embodiments, station 440 may check the CCA in the two directions, e.g., the direction 441 and the direction 442, for example, during a time between an end of the RTS transmission and a beginning of a CTS transmission.

In some demonstrative embodiments, for example, if the CCA is idle in all directions, e.g., directions 441 and 442, station 440 may select to send CTS frames in both directions 441 and 442, e.g., with a specific delay applied to some antennas of station 440.

In some demonstrative embodiments, for example, if the CCA is busy on both directions 441 and 442, station 440 may select not to send anything, and station 402 may defer or cancel the MIMO transmission, e.g., if station 402 does not receive an CTS frame from station 440.

In some demonstrative embodiments, for example, if the CCA is busy only in one direction, e.g., direction 441, station 440 may send the CTS on the direction where the CCA was idle, e.g., direction 442.

In some demonstrative embodiments, station 402 may receive the one or more CTS frames via the one or more different directions, and may determine if a MIMO transmission is possible with all spatial streams, or if only some of the spatial streams can be used, e.g., based on the directions over which the CTS frames are received.

For example, station 402 may receive a CTS frame via direction 415, for example, if station 440 sends the CTS via the direction 442, e.g., where the CCA was determined by station 440 to be idle.

In some demonstrative embodiments, the RTS and/or CTS frames may be configured to carry additional information, e.g., information relating to the spatial streams where the CCA was idle, and/or any other information.

In some demonstrative embodiments, in case of a MU-MIMO transmission, and in case that uplink MU-MIMO is not supported, the RTS/CTS dynamic mechanism may include sending the CTS frames sequentially in time, e.g., not simultaneously. Accordingly, an initiator of the MU-MIMO transmission, e.g., station 402, may receive the CTS frames from a plurality of STAs, e.g., all STAs, separately, e.g., as described below.

Figure 5:
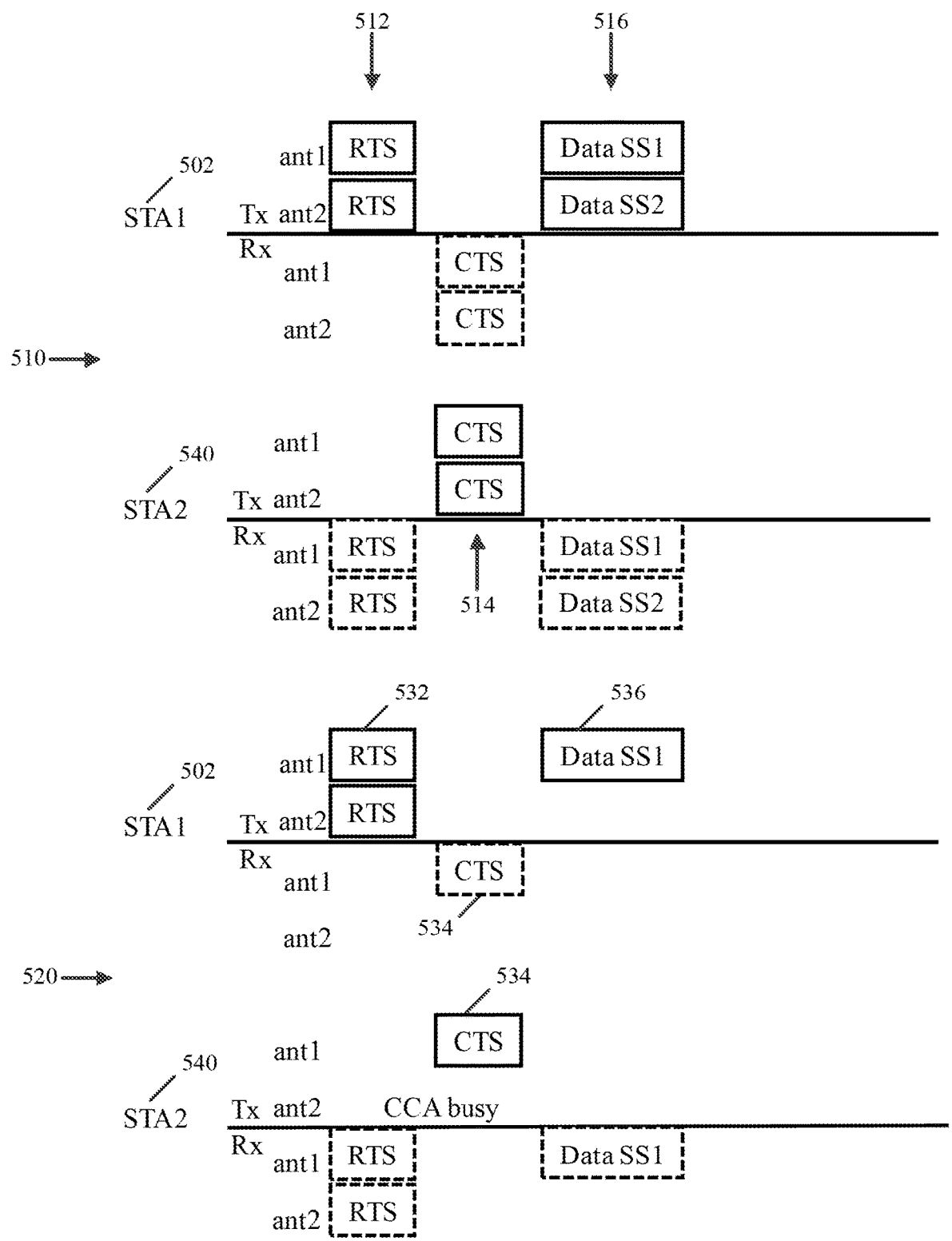
FIG. 5 is a schematic illustration of first and second SU-MIMO transmission sequences from a first station to a second station, in accordance with some demonstrative embodiments.

Reference is made to FIG. 5, which schematically illustrates SU-MIMO transmission sequences 510 and 520 from a first station 502, denoted STA 1, to a second station 540, denoted STA 2, in accordance with some demonstrative embodiments.

For example, STA 502 may perform the functionality of device 102 (FIG. 1), and/or a STA 540 may perform the functionality of device 140 (FIG. 1).

In some demonstrative embodiments, SU-MIMO transmission sequences 510 and/or 520 may include exchanging CTS and RTS frames.

In some demonstrative embodiments, as shown in FIG. 5, MIMO transmission sequence 510 may include transmission of two RTS frames 512 to station 540, e.g., via two respective directions of two respective antennas of station 502.

In some demonstrative embodiments, station 540 may receive the two RTS frames 512, and may check for the CCA state in two directions, from which the two RTS frames 512 are received.

In some demonstrative embodiments, as shown in FIG. 5, station 540 may transmit two CTS frames 514 to station 502, for example, if the CCA state is detected to be idle in each of the two directions, from which the two RTS frames 512 received.

In some demonstrative embodiments, as shown in FIG. 5, station 502 may receive the two CTS frames 514, and may be aware that station 502 is allowed to transmit a MIMO transmission via the two respective directions of the two respective antennas of station 502.

In some demonstrative embodiments, as shown in FIG. 5, station 502 may transmit a MIMO transmission including two data streams 516 to station 540, for example, via the two respective directions of the two respective antennas of station 502.

In some demonstrative embodiments, as shown in FIG. 5, MIMO transmission sequence 520 may include transmission of two RTS frames 532 to station 540, e.g., via two respective directions of two respective antennas of station 502.

In some demonstrative embodiments, station 540 may receive the two RTS frames 532, and may check for the CCA state in the two directions, from which the two RTS frames 532 are received.

In some demonstrative embodiments, as shown in FIG. 5, station 540 may transmit a CTS frame 534 to station 502, for example, if the CCA state is idle only in one selected direction, from the two directions from which the two RTS frames 532 are received.

In some demonstrative embodiments, as shown in FIG. 5, station 502 may receive the CTS frame 534, and may be aware that station 502 is allowed to transmit a transmission only via the direction, from which the CTS frame 534 was received.

In some demonstrative embodiments, as shown in FIG. 5, station 502 may transmit a data stream 536 to station 540, for example, via the direction from which CTS frame 534 was received.

Figure 6:
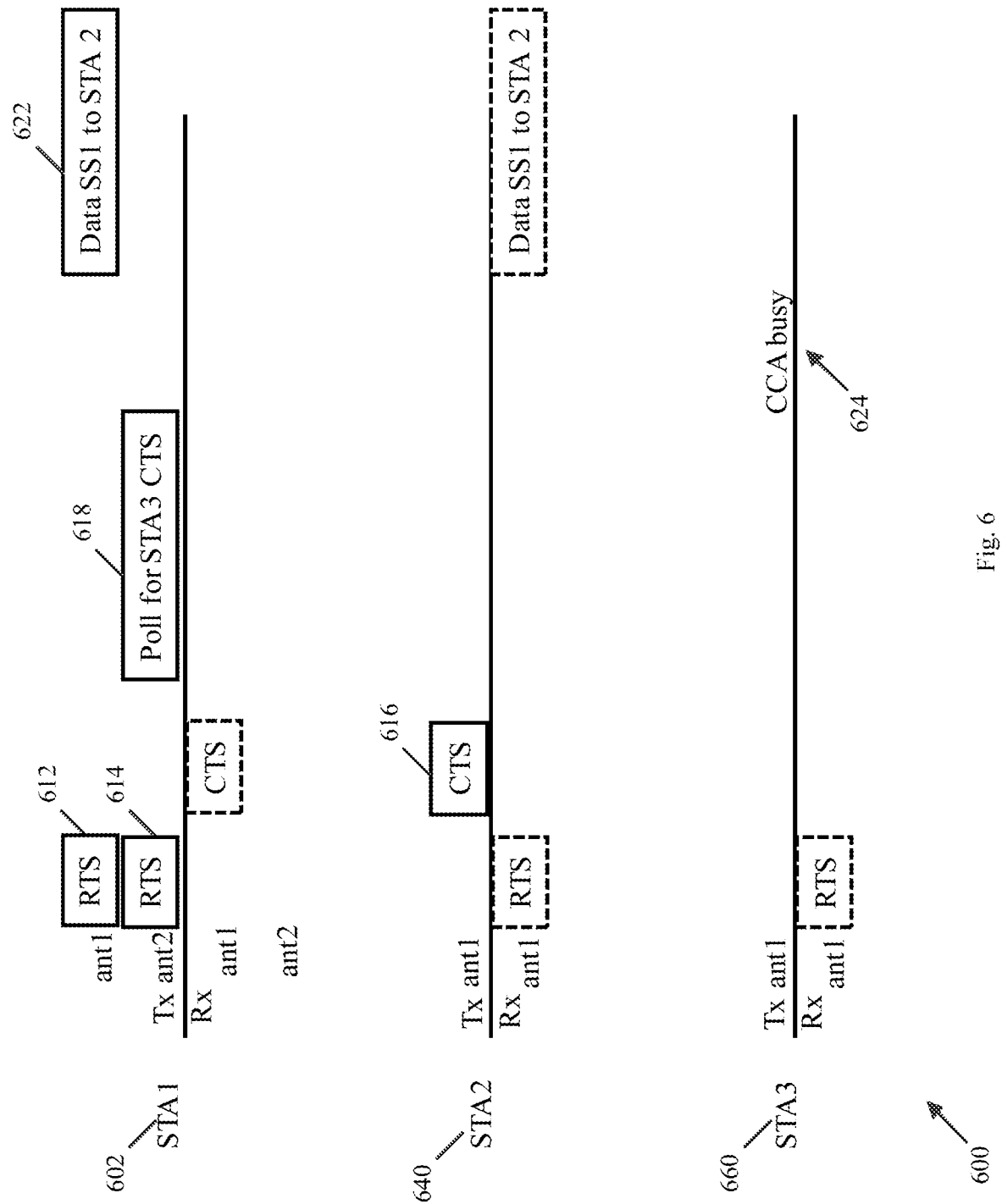
FIG. 6 is a schematic illustration of a MU-MIMO transmission sequence from a first station to second and third stations, in accordance with some demonstrative embodiments.

Reference is made to FIG. 6, which schematically illustrates a MU-MIMO transmission sequence 610 between a first station 602, denoted STA 1, a second station 640, denoted STA 2, and a third station 660, denoted STA 3, in accordance with some demonstrative embodiments.

For example, STA 602 may perform the functionality of device 102 (FIG. 1), and/or STA 640 and/or STA 660 may perform the functionality of device 140 (FIG. 1).

In some demonstrative embodiments, MU-MIMO transmission sequence 610 may include exchanging of CTS frames, and RTS frames.

In some demonstrative embodiments, as shown in FIG. 6, MIMO transmission sequence 610 may include transmission of a first RTS frame 612 to station 640 and a second RTS frame 614 to station 660, e.g., via first and second respective directions.

In some demonstrative embodiments, station 640 may receive the RTS frame 612, and may check for the CCA state in a direction, from which the RTS frame 612 is received.

In some demonstrative embodiments, station 660 may receive the RTS frame 614, and may check for the CCA state in a direction, from which the RTS frame 614 is received.

In some demonstrative embodiments, as shown in FIG. 6, station 640 may transmit a CTS frame 616 to station 602, for example, if the CCA state is idle in the direction, from which the RTS frame 612 is received.

In some demonstrative embodiments, as shown in FIG. 6, station 602 may transmit a poll frame 618 to station 660, for example, to poll for a CTS frame from station 660.

In some demonstrative embodiments, as shown in FIG. 6, station 660 may select not to transmit the CTS frame to station 602, for example, if the CCA state 624 is busy in the direction, from which the RTS frame 614 is received.

In some demonstrative embodiments, as shown in FIG. 6, station 602 may receive CTS frames 616 from station 640, and may not receive a CTS frame from station 660. Accordingly, the station 602 may be aware that the CCA state is idle only in the direction towards station 640.

In some demonstrative embodiments, as shown in FIG. 6, station 602 may transmit a data stream 622 to station 640, for example, via the first direction, for example, the direction from which station 602 receives CTS frame 616 from station 640.

In some demonstrative embodiments, as shown in FIG. 6, station 602 may select not to transmit a data stream to station 660, for example, via the second direction, for example, the direction from which station 602 did not receive a CTS frame from station 660.

Referring back to FIG. 1, in some demonstrative embodiments, a station, e.g., device 102 and/or device 140, may be configured to advertise its capabilities of dynamic spatial domain transmission.

In some demonstrative embodiments, a capability of a STA may include an indication of whether or not the STA is able to reconstruct a PPDU, e.g., on the fly, for example, in case one or more directions are busy, for example, for SU-MIMO, and/or MU-MIMO, e.g., as described above In some demonstrative embodiments, a capability of a STA may include an indication of whether or not the STA is able to perform multi-directional CCA, for example, by a plurality of CCA modules.

In some demonstrative embodiments, a capability of a STA may include an indication of how many directions of a multi-directional CCA are supported by the STA.

In some demonstrative embodiments, a capability of a STA may include an indication of whether or not the STA is able to perform multi-directional CCA in a time between reception of one or more RTS frames and transmission of one or more CTS frames.

Figure 7:
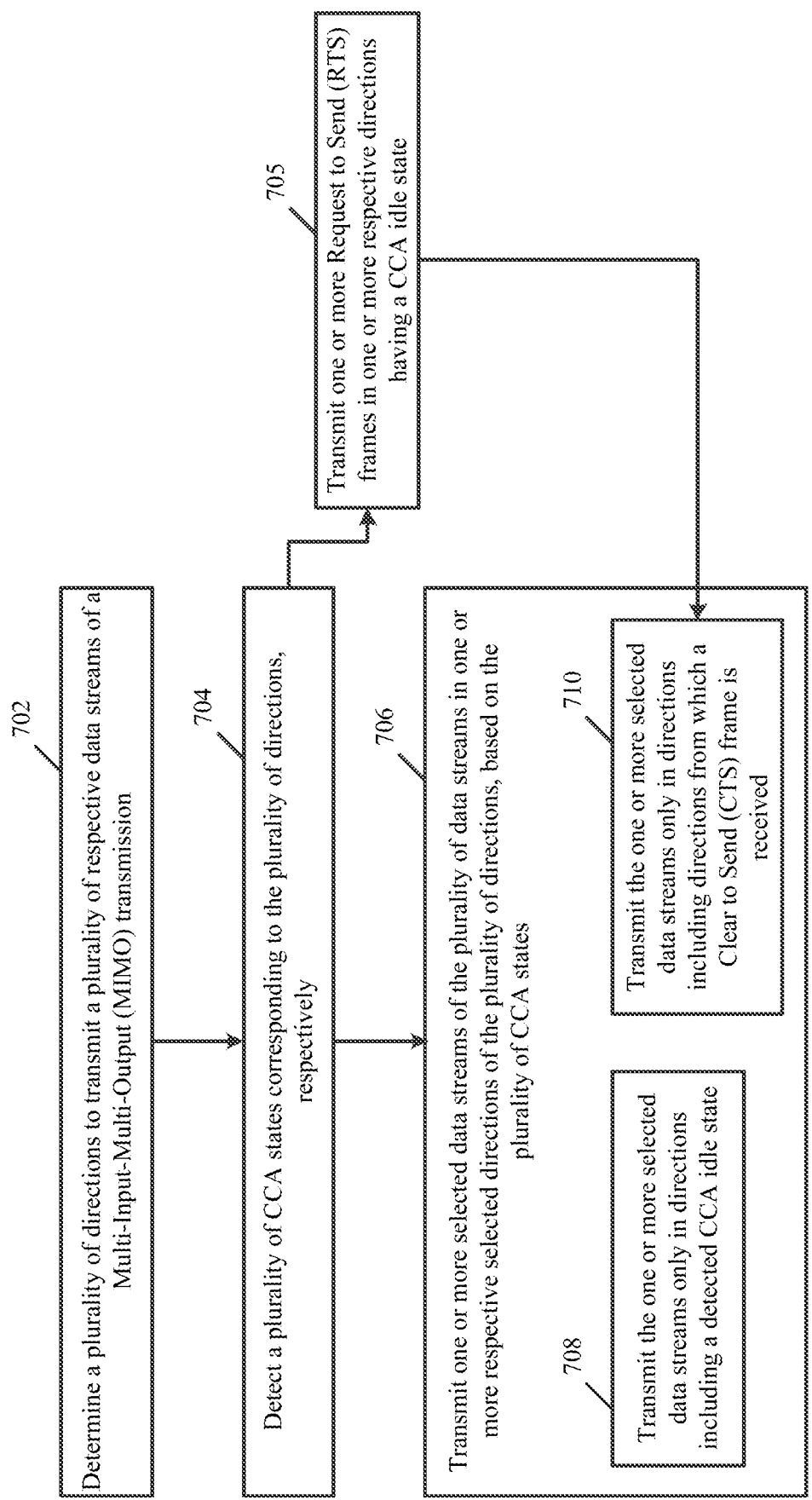
FIG. 7 is a schematic flow-chart illustration of a method of communication based on CCA in one or more directions, in accordance with some demonstrative embodiments.

Reference is made to FIG. 7, which schematically illustrates a method of communication based on CCA in one or more directions, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a CCA module, e.g., CCA modules 126 (FIG. 1) and/or CCA modules 156 (FIG. 1); a radio, e.g., radio 114 (FIG. 1), and/or radio 144 (FIG.

1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 702, the method may include determining a plurality of directions to transmit a plurality of respective data streams of MIMO transmission. For example, controller 124 (FIG. 1) may be configured to control, cause and/or trigger device 102 (FIG. 1) to determine the plurality of directions to transmit the plurality of respective data streams of the MIMO transmission, e.g., as described above.

As indicated at block 704, the method may include detecting a plurality of CCA states corresponding to the plurality of directions, respectively. For example, controller 124 (FIG. 1) may be configured to control, cause and/or trigger device 102 (FIG. 1) to detect the plurality of CCA states corresponding to the plurality of directions, e.g., as described above.

As indicated at block 706, the method may include transmitting one or more selected data streams of the plurality of data streams in one or more respective selected directions of the plurality of directions, based on the plurality of CCA states. For example, controller 124 (FIG. 1) may be configured to control, cause and/or trigger device 102 (FIG. 1) to transmit the one or more selected data streams of the plurality of data streams in the one or more respective selected directions of beam directions 135 (FIG. 1), for example, based on the plurality of CCA states, e.g., as described above.

As indicated at block 708, transmitting the one or more selected data streams in the one or more respective selected directions may include transmitting the one or more selected data streams only in directions including a detected CCA idle state. For example, controller 124 (FIG. 1) may be configured to control, cause and/or trigger device 102 (FIG. 1) to transmit the one or more selected data streams of the plurality of data streams only in directions including a detected CCA idle state, e.g., as described above.

As indicated at block 705, the method may include transmitting one or more RTS frames in one or more respective directions having a CCA idle state. For example, controller 124 (FIG. 1) may be configured to control, cause and/or trigger device 102 (FIG. 1) to transmit the one or more RTS frames in the one or more respective directions having the CCA idle state, e.g., as described above.

As indicated at block 710, transmitting the one or more selected data streams in the one or more respective selected directions may include transmitting the one or more selected data streams only in directions including directions from which a CTS frame is received, e.g., in response to the RTS frames. For example, controller 124 (FIG. 1) may be configured to control, cause and/or trigger device 102 (FIG. 1) to transmit the one or more selected data streams of the plurality of data streams only in the directions from which the CTS frame is received, e.g., as described above.

Figure 8:
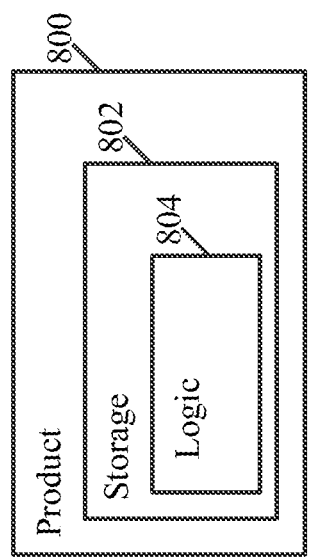
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable non-transitory storage media 802, which may include computer-executable instructions, e.g., implemented by logic 804, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), message processor 158 (FIG. 1), and/or CCA modules 126 (FIG. 1), CCA modules 156 (FIG. 1), and/or to perform, trigger and/or implement one or more operations, communications and/or functionalities according to FIGS. 1, 2, 3, 4, 5, 6, and/or 7, and/or one or more operations described herein. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to determine a plurality of directions to transmit a plurality of respective data streams of a Multi-Input-Multi-Output (MIMO) transmission; detect a plurality of Clear Channel Assessment (CCA) states corresponding to the plurality of directions, respectively; and based on the plurality of CCA states, transmit one or more selected data streams of the plurality of data streams in one or more respective selected directions of the plurality of directions.

Example 2 includes the subject matter of Example 1, and optionally, wherein the one or more selected directions comprise only directions having a detected CCA idle state.

Example 3 includes the subject matter of Example 1 or 2, and optionally, wherein the apparatus is configured to cause the wireless station to construct a Physical Layer Convergence Protocol (PLCP) Protocol Data Unit (PPDU) comprising the plurality of data streams, and to reconstruct the PPDU comprising the one or more selected data streams.

Example 4 includes the subject matter of any one of Examples 1-3, and optionally, wherein the apparatus is configured to cause the wireless station to transmit one or more Request to Send (RTS) frames in one or more respective directions having a CCA idle state.

Example 5 includes the subject matter of Example 4, and optionally, wherein the apparatus is configured to cause the wireless station to transmit a plurality of RTS frames in a plurality of respective directions having the CCA idle state.

Example 6 includes the subject matter of Example 4 or 5, and optionally, wherein the apparatus is configured to cause the wireless station to determine the one or more selected directions to comprise directions from which a Clear to Send (CTS) frame is received.

Example 7 includes the subject matter of any one of Examples 1-6, and optionally, wherein the MIMO transmission is a Single-User (SU) MIMO transmission.

Example 8 includes the subject matter of any one of Examples 1-6, and optionally, wherein the MIMO transmission is a Multi-User (MU) MIMO transmission.

Example 9 includes the subject matter of any one of Examples 1-8, and optionally, wherein the wireless station is a Directional Multi-Gigabit (DMG) Station (STA).

Example 10 includes the subject matter of any one of Examples 1-9, and optionally, comprising one or more directional antennas, a memory, and a processor.

Example 11 includes a system of wireless communication comprising a wireless station, the wireless station comprising one or more directional antennas; a memory; a processor; and a controller configured to cause the wireless station to determine a plurality of directions to transmit a plurality of respective data streams of a Multi-Input-Multi-Output (MIMO) transmission; detect a plurality of Clear Channel Assessment (CCA) states corresponding to the plurality of directions, respectively; and based on the plurality of CCA states, transmit one or more selected data streams of the plurality of data streams in one or more respective selected directions of the plurality of directions.

Example 12 includes the subject matter of Example 11, and optionally, wherein the one or more selected directions comprise only directions having a detected CCA idle state.

Example 13 includes the subject matter of Example 11 or 12, and optionally, wherein the wireless station is to construct a Physical Layer Convergence Protocol (PLCP) Protocol Data Unit (PPDU) comprising the plurality of data streams, and to reconstruct the PPDU comprising the one or more selected data streams.

Example 14 includes the subject matter of any one of Examples 11-13, and optionally, wherein the wireless station is to transmit one or more Request to Send (RTS) frames in one or more respective directions having a CCA idle state.

Example 15 includes the subject matter of Example 14, and optionally, wherein the wireless station is to transmit a plurality of RTS frames in a plurality of respective directions having the CCA idle state.

Example 16 includes the subject matter of Example 14 or 15, and optionally, wherein the wireless station is to determine the one or more selected directions to comprise directions from which a Clear to Send (CTS) frame is received.

Example 17 includes the subject matter of any one of Examples 11-16, and optionally, wherein the MIMO transmission is a Single-User (SU) MIMO transmission.

Example 18 includes the subject matter of any one of Examples 11-16, and optionally, wherein the MIMO transmission is a Multi-User (MU) MIMO transmission.

Example 19 includes the subject matter of any one of Examples 11-18, and optionally, wherein the wireless station is a Directional Multi-Gigabit (DMG) Station (STA).

Example 20 includes a method to be performed at a wireless station, the method comprising determining a plurality of directions to transmit a plurality of respective data streams of a Multi-Input-Multi-Output (MIMO) transmission; detecting a plurality of Clear Channel Assessment (CCA) states corresponding to the plurality of directions, respectively; and based on the plurality of CCA states, transmitting one or more selected data streams of the plurality of data streams in one or more respective selected directions of the plurality of directions.

Example 21 includes the subject matter of Example 20, and optionally, wherein the one or more selected directions comprise only directions having a detected CCA idle state.

Example 22 includes the subject matter of Example 20 or 21, and optionally, comprising constructing a Physical Layer Convergence Protocol (PLCP) Protocol Data Unit (PPDU) comprising the plurality of data streams, and reconstructing the PPDU comprising the one or more selected data streams.

Example 23 includes the subject matter of any one of Examples 20-22, and optionally, comprising transmitting one or more Request to Send (RTS) frames in one or more respective directions having a CCA idle state.

Example 24 includes the subject matter of Example 23, and optionally, comprising transmitting a plurality of RTS frames in a plurality of respective directions having the CCA idle state.

Example 25 includes the subject matter of Example 23 or 24, and optionally, comprising determining the one or more selected directions to comprise directions from which a Clear to Send (CTS) frame is received.

Example 26 includes the subject matter of any one of Examples 20-25, and optionally, wherein the MIMO transmission is a Single-User (SU) MIMO transmission.

Example 27 includes the subject matter of any one of Examples 20-25, and optionally, wherein the MIMO transmission is a Multi-User (MU) MIMO transmission.

Example 28 includes the subject matter of any one of Examples 20-27, and optionally, wherein the wireless station is a Directional Multi-Gigabit (DMG) Station (STA).

Example 29 includes a product comprising one or more tangible computer-readable non-transitory storage media comprising computer-executable instructions operable to, when executed by at least one computer processor, enable the at least one computer processor to implement operations at a wireless station, the operations comprising determining a plurality of directions to transmit a plurality of respective data streams of a Multi-Input-Multi-Output (MIMO) transmission; detecting a plurality of Clear Channel Assessment (CCA) states corresponding to the plurality of directions, respectively; and based on the plurality of CCA states, transmitting one or more selected data streams of the plurality of data streams in one or more respective selected directions of the plurality of directions.

Example 30 includes the subject matter of Example 29, and optionally, wherein the one or more selected directions comprise only directions having a detected CCA idle state.

Example 31 includes the subject matter of Example 29 or 30, and optionally, wherein the operations comprise constructing a Physical Layer Convergence Protocol (PLCP) Protocol Data Unit (PPDU) comprising the plurality of data streams, and reconstructing the PPDU comprising the one or more selected data streams.

Example 32 includes the subject matter of any one of Examples 29-31, and optionally, wherein the operations comprise transmitting one or more Request to Send (RTS) frames in one or more respective directions having a CCA idle state.

Example 33 includes the subject matter of Example 32, and optionally, wherein the operations comprise transmitting a plurality of RTS frames in a plurality of respective directions having the CCA idle state.

Example 34 includes the subject matter of Example 32 or 33, and optionally, wherein the operations comprise determining the one or more selected directions to comprise directions from which a Clear to Send (CTS) frame is received.

Example 35 includes the subject matter of any one of Examples 29-34, and optionally, wherein the MIMO transmission is a Single-User (SU) MIMO transmission.

Example 36 includes the subject matter of any one of Examples 29-34, and optionally, wherein the MIMO transmission is a Multi-User (MU) MIMO transmission.

Example 37 includes the subject matter of any one of Examples 29-36, and optionally, wherein the wireless station is a Directional Multi-Gigabit (DMG) Station (STA).

Example 38 includes an apparatus of wireless communication by a wireless station, the apparatus comprising means for determining a plurality of directions to transmit a plurality of respective data streams of a Multi-Input-Multi-Output (MIMO) transmission; means for detecting a plurality of Clear Channel Assessment (CCA) states corresponding to the plurality of directions, respectively; and means for, based on the plurality of CCA states, transmitting one or more selected data streams of the plurality of data streams in one or more respective selected directions of the plurality of directions.

Example 39 includes the subject matter of Example 38, and optionally, wherein the one or more selected directions comprise only directions having a detected CCA idle state.

Example 40 includes the subject matter of Example 38 or 39, and optionally, comprising means for constructing a Physical Layer Convergence Protocol (PLCP) Protocol Data Unit (PPDU) comprising the plurality of data streams, and reconstructing the PPDU comprising the one or more selected data streams.

Example 41 includes the subject matter of any one of Examples 38-40, and optionally, comprising means for transmitting one or more Request to Send (RTS) frames in one or more respective directions having a CCA idle state.

Example 42 includes the subject matter of Example 41, and optionally, comprising means for transmitting a plurality of RTS frames in a plurality of respective directions having the CCA idle state.

Example 43 includes the subject matter of Example 41 or 42, and optionally, comprising means for determining the one or more selected directions to comprise directions from which a Clear to Send (CTS) frame is received.

Example 44 includes the subject matter of any one of Examples 38-43, and optionally, wherein the MIMO transmission is a Single-User (SU) MIMO transmission.

Example 45 includes the subject matter of any one of Examples 38-43, and optionally, wherein the MIMO transmission is a Multi-User (MU) MIMO transmission.

Example 46 includes the subject matter of any one of Examples 38-45, and optionally, wherein the wireless station is a Directional Multi-Gigabit (DMG) Station (STA).

Example 47 includes an apparatus comprising logic and circuitry configured to cause a first wireless station to receive from a second wireless station one or more Request to Send (RTS) frames from one or more respective directions; detect one or more Clear Channel Assessment (CCA) states corresponding to the one or more directions, respectively; and transmit to the second wireless station one or more Clear to Send (CTS) frames in one or more respective selected directions of the one or more directions, based on the one or more CCA states.

Example 48 includes the subject matter of Example 47, and optionally, wherein the one or more selected directions comprise only directions having a detected CCA idle state.

Example 49 includes the subject matter of Example 47 or 48, and optionally, wherein the apparatus is configured to cause the first wireless station to receive from the second wireless station a plurality of Request to Send (RTS) frames from a plurality of different directions, and to detect a plurality of CCA states corresponding to the plurality of different directions, respectively.

Example 50 includes the subject matter of any one of Examples 47-49, and optionally, wherein the one or more RTS frames comprise a plurality of RTS frames received from a plurality of different directions.

Example 51 includes the subject matter of Example 50, and optionally, wherein the apparatus is configured to cause the first wireless station to select a plurality of selected directions from the plurality of different directions, based on a plurality of CCA states corresponding to the plurality of different directions, and to transmit a plurality of CTS frames in the plurality of selected directions.

Example 52 includes the subject matter of Example 51, and optionally, wherein the apparatus is configured to cause the first wireless station to sequentially transmit two or more CTS frames of the plurality of CTS frames.

Example 53 includes the subject matter of Example 51, and optionally, wherein the apparatus is configured to cause the first wireless station to simultaneously transmit two or more CTS frames of the plurality of CTS frames.

Example 54 includes the subject matter of any one of Examples 47-53, and optionally, wherein the apparatus is configured to cause the first wireless station to transmit the one or more CTS frames in response to a poll frame from the second wireless station.

Example 55 includes the subject matter of any one of Examples 47-54, and optionally, wherein the apparatus is configured to cause the first wireless station to process a Multi-Input-Multi-Output (MIMO) transmission received from the second wireless device via the one or more selected directions.

Example 56 includes the subject matter of Example 55, and optionally, wherein the MIMO transmission is a Single-User (SU) MIMO transmission.

Example 57 includes the subject matter of Example 55, and optionally, wherein the MIMO transmission is a Multi-User (MU) MIMO transmission.

Example 58 includes the subject matter of any one of Examples 47-57, and optionally, wherein the first wireless station is a Directional Multi-Gigabit (DMG) Station (STA).

Example 59 includes the subject matter of any one of Examples 47-58, and optionally, comprising one or more directional antennas, a memory, and a processor.

Example 60 includes a system of wireless communication comprising a first wireless station, the wireless station comprising one or more directional antennas; a memory; a processor; and a controller configured to cause the first wireless station to receive from a second wireless station one or more Request to Send (RTS) frames from one or more respective directions; detect one or more Clear Channel Assessment (CCA) states corresponding to the one or more directions, respectively; and transmit to the second wireless station one or more Clear to Send (CTS) frames in one or more respective selected directions of the one or more directions, based on the one or more CCA states.

Example 61 includes the subject matter of Example 60, and optionally, wherein the one or more selected directions comprise only directions having a detected CCA idle state.

Example 62 includes the subject matter of Example 60 or 61, and optionally, wherein the first wireless station is to receive from the second wireless station a plurality of Request to Send (RTS) frames from a plurality of different directions, and to detect a plurality of CCA states corresponding to the plurality of different directions, respectively.

Example 63 includes the subject matter of any one of Examples 60-62, and optionally, wherein the one or more RTS frames comprise a plurality of RTS frames received from a plurality of different directions.

Example 64 includes the subject matter of Example 63, and optionally, wherein the first wireless station is to select a plurality of selected directions from the plurality of different directions, based on a plurality of CCA states corresponding to the plurality of different directions, and to transmit a plurality of CTS frames in the plurality of selected directions.

Example 65 includes the subject matter of Example 64, and optionally, wherein the first wireless station is to sequentially transmit two or more CTS frames of the plurality of CTS frames.

Example 66 includes the subject matter of Example 64, and optionally, wherein the first wireless station is to simultaneously transmit two or more CTS frames of the plurality of CTS frames.

Example 67 includes the subject matter of any one of Examples 60-66, and optionally, wherein the first wireless station is to transmit the one or more CTS frames in response to a poll frame from the second wireless station.

Example 68 includes the subject matter of any one of Examples 60-67, and optionally, wherein the first wireless station is to process a Multi-Input-Multi-Output (MIMO) transmission received from the second wireless device via the one or more selected directions.

Example 69 includes the subject matter of Example 68, and optionally, wherein the MIMO transmission is a Single-User (SU) MIMO transmission.

Example 70 includes the subject matter of Example 68, and optionally, wherein the MIMO transmission is a Multi-User (MU) MIMO transmission.

Example 71 includes the subject matter of any one of Examples 60-70, and optionally, wherein the first wireless station is a Directional Multi-Gigabit (DMG) Station (STA).

Example 72 includes a method to be performed at a first wireless station, the method comprising receiving from a second wireless station one or more Request to Send (RTS) frames from one or more respective directions; detecting one or more Clear Channel Assessment (CCA) states corresponding to the one or more directions, respectively; and transmitting to the second wireless one or more Clear to Send (CTS) frames in one or more respective selected directions of the one or more directions, based on the one or more CCA states.

Example 73 includes the subject matter of Example 72, and optionally, wherein the one or more selected directions comprise only directions having a detected CCA idle state.

Example 74 includes the subject matter of Example 72 or 73, and optionally, comprising receiving from the second wireless station a plurality of Request to Send (RTS) frames from a plurality of different directions, and detecting a plurality of CCA states corresponding to the plurality of different directions, respectively.

Example 75 includes the subject matter of any one of Examples 72-74, and optionally, wherein the one or more RTS frames comprise a plurality of RTS frames received from a plurality of different directions.

Example 76 includes the subject matter of Example 75, and optionally, comprising selecting a plurality of selected directions from the plurality of different directions, based on a plurality of CCA states corresponding to the plurality of different directions, and transmitting a plurality of CTS frames in the plurality of selected directions.

Example 77 includes the subject matter of Example 76, and optionally, comprising sequentially transmitting two or more CTS frames of the plurality of CTS frames.

Example 78 includes the subject matter of Example 76, and optionally, comprising simultaneously transmitting two or more CTS frames of the plurality of CTS frames.

Example 79 includes the subject matter of any one of Examples 72-78, and optionally, comprising transmitting the one or more CTS frames in response to a poll frame from the second wireless station.

Example 80 includes the subject matter of any one of Examples 72-79, and optionally, comprising processing a Multi-Input-Multi-Output (MIMO) transmission received from the second wireless device via the one or more selected directions.

Example 81 includes the subject matter of Example 80, and optionally, wherein the MIMO transmission is a Single-User (SU) MIMO transmission.

Example 82 includes the subject matter of Example 80, and optionally, wherein the MIMO transmission is a Multi-User (MU) MIMO transmission.

Example 83 includes the subject matter of any one of Examples 72-82, and optionally, wherein the first wireless station is a Directional Multi-Gigabit (DMG) Station (STA).

Example 84 includes a product comprising one or more tangible computer-readable non-transitory storage media comprising computer-executable instructions operable to, when executed by at least one computer processor, enable the at least one computer processor to implement operations at a first wireless station, the operations comprising receiving from a second wireless station one or more Request to Send (RTS) frames from one or more respective directions; detecting one or more Clear Channel Assessment (CCA) states corresponding to the one or more directions, respectively; and transmitting to the second wireless one or more Clear to Send (CTS) frames in one or more respective selected directions of the one or more directions, based on the one or more CCA states.

Example 85 includes the subject matter of Example 84, and optionally, wherein the one or more selected directions comprise only directions having a detected CCA idle state.

Example 86 includes the subject matter of Example 84 or 85, and optionally, wherein the operations comprise receiving from the second wireless station a plurality of Request to Send (RTS) frames from a plurality of different directions, and detecting a plurality of CCA states corresponding to the plurality of different directions, respectively.

Example 87 includes the subject matter of any one of Examples 84-86, and optionally, wherein the one or more RTS frames comprise a plurality of RTS frames received from a plurality of different directions.

Example 88 includes the subject matter of Example 87, and optionally, wherein the operations comprise selecting a plurality of selected directions from the plurality of different directions, based on a plurality of CCA states corresponding to the plurality of different directions, and transmitting a plurality of CTS frames in the plurality of selected directions.

Example 89 includes the subject matter of Example 88, and optionally, wherein the operations comprise sequentially transmitting two or more CTS frames of the plurality of CTS frames.

Example 90 includes the subject matter of Example 88, and optionally, wherein the operations comprise simultaneously transmitting two or more CTS frames of the plurality of CTS frames.

Example 91 includes the subject matter of any one of Examples 84-90, and optionally, wherein the operations comprise transmitting the one or more CTS frames in response to a poll frame from the second wireless station.

Example 92 includes the subject matter of any one of Examples 84-91, and optionally, wherein the operations comprise processing a Multi-Input-Multi-Output (MIMO) transmission received from the second wireless device via the one or more selected directions.

Example 93 includes the subject matter of Example 92, and optionally, wherein the MIMO transmission is a Single-User (SU) MIMO transmission.

Example 94 includes the subject matter of Example 92, and optionally, wherein the MIMO transmission is a Multi-User (MU) MIMO transmission.

Example 95 includes the subject matter of any one of Examples 84-94, and optionally, wherein the first wireless station is a Directional Multi-Gigabit (DMG) Station (STA).

Example 96 includes an apparatus of wireless communication by a first wireless station, the apparatus comprising means for receiving from a second wireless station one or more Request to Send (RTS) frames from one or more respective directions; means for detecting one or more Clear Channel Assessment (CCA) states corresponding to the one or more directions, respectively; and means for transmitting to the second wireless one or more Clear to Send (CTS) frames in one or more respective selected directions of the one or more directions, based on the one or more CCA states.

Example 97 includes the subject matter of Example 96, and optionally, wherein the one or more selected directions comprise only directions having a detected CCA idle state.

Example 98 includes the subject matter of Example 96 or 97, and optionally, comprising means for receiving from the second wireless station a plurality of Request to Send (RTS) frames from a plurality of different directions, and detecting a plurality of CCA states corresponding to the plurality of different directions, respectively.

Example 99 includes the subject matter of any one of Examples 96-98, and optionally, wherein the one or more RTS frames comprise a plurality of RTS frames received from a plurality of different directions.

Example 100 includes the subject matter of Example 99, and optionally, comprising means for selecting a plurality of selected directions from the plurality of different directions, based on a plurality of CCA states corresponding to the plurality of different directions, and transmitting a plurality of CTS frames in the plurality of selected directions.

Example 101 includes the subject matter of Example 100, and optionally, comprising means for sequentially transmitting two or more CTS frames of the plurality of CTS frames.

Example 102 includes the subject matter of Example 100, and optionally, comprising means for simultaneously transmitting two or more CTS frames of the plurality of CTS frames.

Example 103 includes the subject matter of any one of Examples 96-102, and optionally, comprising means for transmitting the one or more CTS frames in response to a poll frame from the second wireless station.

Example 104 includes the subject matter of any one of Examples 96-103, and optionally, comprising means for processing a Multi-Input-Multi-Output (MIMO) transmission received from the second wireless device via the one or more selected directions.

Example 105 includes the subject matter of Example 104, and optionally, wherein the MIMO transmission is a Single-User (SU) MIMO transmission.

Example 106 includes the subject matter of Example 104, and optionally, wherein the MIMO transmission is a Multi-User (MU) MIMO transmission.

Example 107 includes the subject matter of any one of Examples 96-106, and optionally, wherein the first wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless station to:
   construct a Physical Layer Convergence Protocol (PLCP) Protocol Data Unit (PPDU) comprising a plurality of data streams of a Multiple-Input-Multiple-Output (MIMO) transmission;
   determine a plurality of directions to transmit the plurality of data streams, respectively;
   detect a plurality of Clear Channel Assessment (CCA) states corresponding to the plurality of directions, respectively;
   based on the plurality of CCA states, transmit a plurality of Request to Send (RTS) frames in a plurality of respective directions having a CCA idle state;
   determine one or more selected directions of the plurality a directions to comprise directions from which a Clear to Send (CTS) frame is received; and
   transmit one or more selected data streams of the plurality of data streams in the one or more selected directions, respectively, by reconstructing the PPDU to comprise the one or more selected data streams.

2. The apparatus of claim 1, wherein the one or more selected directions comprise only directions having a detected CCA idle state.

3. The apparatus of claim 1, wherein the MIMO transmission is a Single-User (SU) MIMO transmission.

4. The apparatus of claim 1, wherein the MIMO transmission is a Multi-User (MU) MIMO transmission.

5. The apparatus of claim 1, wherein the wireless station is a Directional Multi-Gigabit (DMG) Station (STA).

6. The apparatus of claim 1 comprising one or more directional antennas, a memory, and a processor.

7. A product comprising one or more tangible computer-readable non-transitory storage media comprising computer-executable instructions operable to, when executed by at least one processor, enable the at least one processor to cause a wireless station to:
construct a Physical Layer Convergence Protocol (PLCP) Protocol Data Unit (PPDU) comprising a plurality of data streams of a Multiple-input-Multiple-Output (MIMO) transmission;
determine a plurality of directions to transmit the plurality of data streams, respectively;
detect a plurality of Clear Channel Assessment (CCA) states corresponding to the plurality of directions, respectively;
based on the plurality of CCA states, transmit a plurality of Request to Send (RES) frames in a plurality of respective directions having a CCA idle state;
determine one or more selected directions of the plurality of directions to comprise directions from which a Clear to Send (CTS) frame is received; and
transmit one or more selected data streams of the plurality of data streams in the one or more selected directions, respectively, by reconstructing the PPDU to comprise the one or more selected data streams.

8. The product of claim 7, wherein the one or more selected directions comprise only directions having a detected CCA idle state.

9. The product of claim 7, wherein the MIMO transmission is a Multi-User (MU) MIMO transmission.

10. An apparatus comprising logic and circuitry configured to cause a first wireless station to:
receive from a second wireless station plurality of Request to Send (RTS) frames from a plurality of respective different directions;
detect a plurality of Clear Channel Assessment (CCA) states corresponding to the plurality of directions, respectively;
select a plurality of selected directions from the plurality of directions based on the plurality of CCA states corresponding to the plurality of directions, the plurality of selected directions comprise only directions having a detected CCA idle state; and
transmit to the second wireless station a plurality of Clear to Send (CTS) frames in the plurality of selected directions, respectively.

11. The apparatus of claim 10 configured to cause the first wireless station to simultaneously transmit two or more CTS frames of the plurality of CTS frames.

12. The apparatus of claim 10 configured to cause the first wireless station to transmit the plurality of CTS frames in response to a poll frame from said second wireless station.

13. The apparatus of claim 10 configured to cause the first wireless station to process a Multiple-Input-Multiple-Output (MIMO) transmission received from said second wireless station via the plurality of selected directions.

14. The apparatus of claim 10 comprising one or more directional antennas, a memory, and a processor.

15. A product comprising one or more tangible computer-readable non-transitory storage media comprising computer-executable instructions operable to, when executed by at least one processor, enable the at least one processor to cause a first wireless station to:
receive from a second wireless station a plurality of Request to Send (RTS) frames from a plurality of respective different directions;
detect a plurality of Clear Channel Assessment (CCA) states corresponding to the plurality of directions, respectively;
select a plurality of selected directions from the plurality of directions based on the plurality of CCA states corresponding to the plurality of directions, the plurality of selected directions comprise only directions having a detected CCA idle state; and
transmit to the second wireless station a plurality of Clear to Send (CTS) frames in the plurality of selected directions, respectively.

16. The product of claim 15, wherein the instructions, when executed, cause the first wireless station to process a Multiple-Input-Multiple-Output (MIMO) transmission received from said second wireless station via the plurality of selected directions.

17. The product of claim 15, wherein the instructions, when executed, cause the first wireless station to simultaneously transmit two or more CTS frames of the plurality of CTS frames.

* * * * *